United States Patent [19]
Spies et al.

[11] Patent Number: 5,642,695
[45] Date of Patent: Jul. 1, 1997

[54] HEATING MODULE FOR A COMBUSTION ENGINE

[75] Inventors: Karl-Heinz Spies, Birkenau; Joachim Heinemann, Groxheimertal; Uwe Meinig, Weinheim, all of Germany

[73] Assignee: Firma Carl Freudenberg, Weinheim, Germany

[21] Appl. No.: 622,711

[22] Filed: Mar. 26, 1996

[30] Foreign Application Priority Data

Mar. 30, 1995 [DE] Germany ............. 195 11 685.2

[51] Int. Cl.$^6$ .............. F02M 31/04; F02F 11/00
[52] U.S. Cl. .................. 123/142.5 E; 123/549; 219/551
[58] Field of Search ............ 123/142.5 E, 549; 219/205, 543, 544, 551

[56] References Cited

U.S. PATENT DOCUMENTS

| | | | |
|---|---|---|---|
| 5,086,747 | 2/1992 | Curhan | 123/549 |
| 5,297,530 | 3/1994 | Kaneko et al. | 123/549 |
| 5,438,969 | 8/1995 | Kurr et al. | 123/549 |

FOREIGN PATENT DOCUMENTS

| | | | |
|---|---|---|---|
| 0 343 652 | 11/1989 | European Pat. Off. | |
| 456533 | 11/1991 | European Pat. Off. | 123/549 |
| 469261 | 2/1992 | European Pat. Off. | 123/549 |
| 43 14 283 A1 | 11/1994 | Germany. | |
| 207874 | 9/1986 | Japan | 123/549 |
| 2257749 | 1/1993 | United Kingdom | 123/549 |

*Primary Examiner*—Erick R. Solis
*Attorney, Agent, or Firm*—Kenyon & Kenyon

[57] ABSTRACT

A heating module for a mixture-compressing combustion engine which is arranged between an induction pipe and a cylinder head of the combustion engine. The induction pipe, the heating module and the cylinder head delimit at least one intake port in which at least one electrically heatable heating element is arranged which constitutes a component of the heating module. The heating module is connectable with connecting terminals to an electric current source and the joining surfaces between the induction pipe, the heating module and the cylinder head are sealed by a sealing device. The heating module includes at least one thin plate made of metallic material. A conductor made of electrically conductive material is secured on the plate. The sealing devices are constructed in one piece with the heating module on the side facing the induction pipe and the side facing the cylinder head.

8 Claims, 7 Drawing Sheets

HEATING MODULE FOR A COMBUSTION ENGINE

BACKGROUND OF THE INVENTION

1. FIELD OF THE INVENTION

The present invention relates to a heating module for a mixture-compressing combustion engine. The heating module is arranged between an induction pipe and a cylinder head of the combustion engine, the induction pipe, the heating module and the cylinder head delimiting at least one intake port in which at least one electrically heatable heating element is arranged. The heating element constitutes a component of the heating module, and the heating element is connectable with connecting terminals to an electric current source. The joining surfaces between the induction pipe, the heating module and the cylinder head are each sealed by at least one sealing device.

2. DESCRIPTION OF THE PRIOR ART

A heating module is shown in German patent DE 43 14 283 A1. The electrically heatable heating element in that patent has a tub-shaped cross-section transverse to the direction of flow and can be connected to a flange which is a component of the intake port. Viewed in the direction of flow, the flange has a comparatively large thickness in order to be able to surround a wire through which a heating medium flows. In addition to electrical heating, the heating elements can be heated by a medium already heated by the engine, for example by coolant. Therefore, already a few minutes after a cold start of the engine, electrical heating of the heating element can be switched off, and only the coolant, which is heated anyway, is used for further heating. In addition, the intermediate flange which accommodates the heating elements can be designed to be so broad that the mounting surfaces of the injection nozzles can be integrated into the flange.

European patent EP 0 343 652 A1 shows a flange in which the suspension mount of the heating elements on the flange is very massive. The heavy dimensional design of this suspension mount results in a restriction of the intake air, so that a considerable full-load charge loss and a resulting reduction in the maximum possible engine power follows. Furthermore, during circumflowing, the massive suspension mounts result in dead spaces through which the air-fuel mixture does not flow so that, particularly at low temperatures of the intake air, the heating element and the suspension mounts, considerable amounts of liquid fuel, viewed in the direction of flow, deposit behind the suspension mounts on the intake port wall, the heating elements and the suspension mounts. This phenomena causes the HC and CO emissions to worsen, primarily during dynamic travel operation. The use of a relatively thick flange and a thick, separately installed sealing device leads to nonuniformities in the port, especially in the case of intake ports in which the joining surfaces between the cylinder head and the induction pipe are not arranged perpendicular to the center line of the intake port, and this promotes intake throttling loss. Besides the design restrictions resulting from this, in addition the expenditure for design changes in the subsequent application of a heating flange to an existing engine concept increases.

SUMMARY OF THE INVENTION

The problem which the invention seeks to solve is to further develop a heating module in such a way that its dimensions correspond essentially to the dimensions of conventionally used sealing devices arranged between the induction pipe and the cylinder head, so that a simple retrofitting to existing engine concepts is possible, so that the joining surfaces are reliably sealed during a long service life, and so that the installation of the heating module is simplified.

In the present invention, the heating module includes at least one foil-like thin plate made of metallic material, a circuit-board conductor made of electrically conductive material is secured on the plate, and the sealing devices on the side facing the induction pipe and the side facing the cylinder head are constructed in one piece with the heating module. It is advantageous if the heating module, and the sealing devices adjoining it on both sides in the direction of flow, form a unit which can be preassembled so that installation is considerably simplified. The preassemblable unit including the heating module and the sealing devices can easily be positioned in the direction of the induction pipe and the cylinder head, so that the danger of installation errors and leaks are reduced to a minimum due to simplified handling. The dimensions of the preassemblable unit correspond essentially to the dimensions of flat seals arranged between the induction pipe and the cylinder head in the case of combustion engines without induction pipe preheating. Due to this design, in existing engines, an induction pipe preheating unit can be retrofitted by the simple exchange of the existing sealing device for the heating module without design changes to the engine. The advantageous dimensions of the heating module are attained by a sandwich-like design, preferably two foil-like thin plates made of metallic material being used between which a very thin conductor. The sealing devices on the side facing the cylinder head and the induction pipe likewise are thin and constructed in one piece with the plates.

Preferably the conductor is made of copper and an insulating layer, for example made of polyamide or fibers bonded with adhesives, and is joined adhesively to at least one of the plates. Preferably, the conductor is bonded to both plates. It is advantageous if the printed-circuit board is completely enclosed by the metallic material of the plates and because of this is reliably protected from external influences.

The plates can have a thickness of 0.2 to 1.5 mm, preferably from 0.5 to 1 mm, and can be made of a heat-conducting metal alloy. The heat-conducting metal alloy is preferably an aluminum alloy, although alloys different from that may be used. It is advantageous if the plates can be deformed easily. In addition, the entire heating module has a low weight which, in view of the effect of the relatively high vibrational acceleration of the combustion engine, is an advantage. Because the heating module and the type of sealing devices usually used in this region are nearly in identical weight, the vibrational characteristics of the combustion engine is not negatively influenced upon exchange of the existing sealing device for the heating module of the present invention.

The plates of the present invention can be provided with joining surfaces which have integrally molded sealing devices made of elastomeric material. The sealing devices position themselves against the adjoining surfaces of the induction pipe and the cylinder head, and seal during a long service life.

With the exception of the cross-section of the intake port, at least one of the plates can have a sealing device covering its joining surface in a manner that is foil-like thin and spread flat, the sealing device being provided with an opening corresponding to the cross-section of the intake port. For example, the sealing device can be sprayed on the joining surface of the plate without having to take into consideration exact shaping. Due to the flat-spread covering of the plates and the resulting large surface, the mechanical stress on the elastomeric material is comparatively small.

According to another feature of the present invention, at least one of the plates can be provided with an essentially bulge-type sealing projection which has a sealing surface on its side facing away from the joining surface of the plate, and the sealing projection can be arranged along the outer contour of the plate and sealingly surround the intake port. The sealing projection can be constructed in two parts, a first part being arranged along the outer contour of the plate, and a second part surrounding the intake port making a seal. A sealing projection made of elastomeric material is pressed on in the clearance to the outer contour and to the port passages. An extrusion-coating of the outer contour and the port passages is possible as well. By this feature, intimate joining of the two flange plates can be realized.

BRIEF DESCRIPTION OF THE DRAWINGS

The heating module according to present invention is explained more precisely with the aid of the attached drawings. They show, in schematic representation.

DETAILED DESCRIPTION OF THE INVENTION

Figure 1:
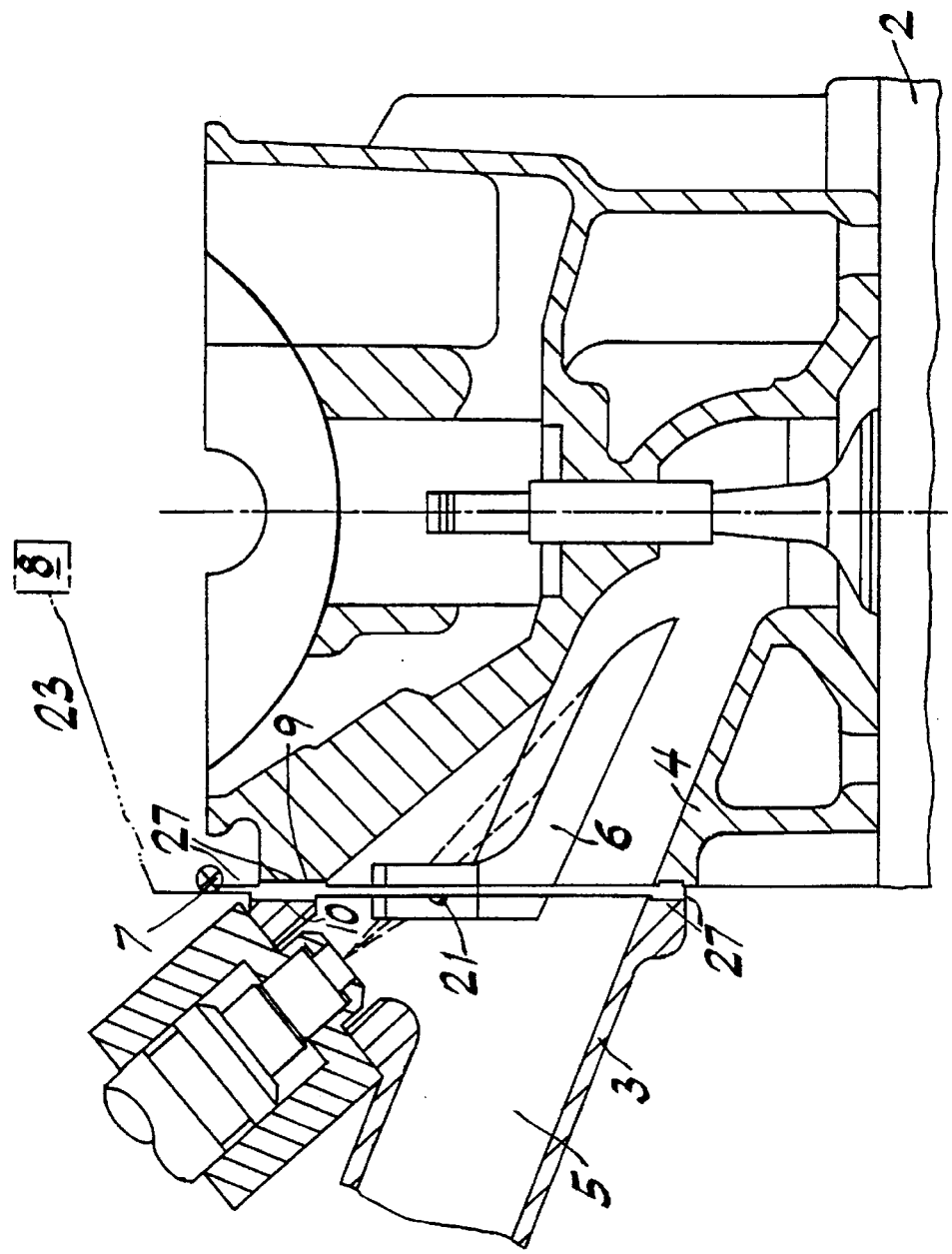
FIG. 1 shows the heating module according to the invention installed, and in cross-sectional view.

In FIG. 1 through 9 three exemplary embodiments of heating modules of the present invention are shown, each heating module 1 being provided for a mixture-compressing four-cylinder combustion engine 2. Each of the heating modules 1 shown is arranged between an induction pipe 3 and a cylinder head 4 of the combustion engine 2, the intake ports 5 of each cylinder leading through the induction pipe 3, the heating module 1 and the cylinder head 4. The electrically heated heating elements 6 constitute a component of the heating module 1, the heating elements being provided with connecting terminals 7 and being connected to an electric current source 8 by connecting cables 23. The heating module 1 is provided with sealing devices 11, 12 which seal the joining surfaces 9, 10 in the direction of the induction pipe 3 and the cylinder head 4. In each of the exemplary embodiments, the heating module 1 includes two foil-like thin plates 13, 14 which can be made of, e.g., aluminum alloy. A conductor 15 made of electrically conductive material is arranged between the plates 13, 14 and is joined adhesively to the two plates 13, 14. Sealing devices 11, 12 are arranged in the direction of flow on both sides of the heating module 1. Sealing devices 11, 12 seal the heating module 1 in the direction of the induction pipe 3 and in the direction of the cylinder head 4. In the preferred embodiment, the plates 13, 14 each have a thickness of 0.5 mm.

Figure 2:
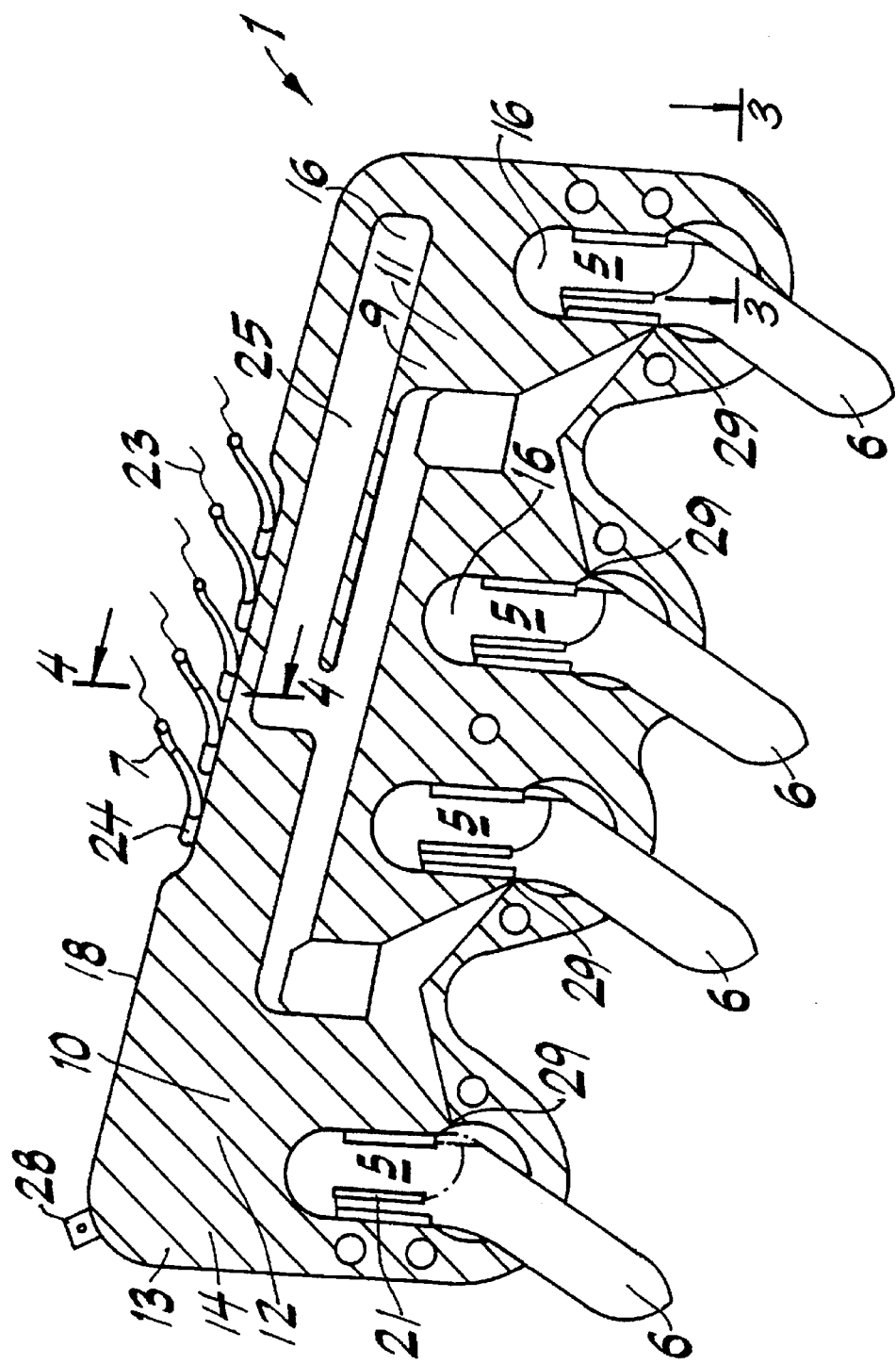
FIG. 2 shows a first exemplary embodiment of a heating module according to the present invention for a four-cylinder combustion engine.

In FIG. 2 a first exemplary embodiment of a heating module 1 according to the invention is shown in which the joining surfaces 9, 10 are provided with integrally molded sealing devices 11, 12 made of elastomeric material. The sealing devices 11, 12 are designed to be foil-like thin and cover the flange surfaces 9, 10 in a spread flat manner —with the exception of the cross-section of the intake port 5 and, in this example, the feeding and distribution cross-section 25 for secondary gases, for example gases from the crankcase ventilation system or from the fuel tank vent line or recirculated exhaust gas. Intake port cross-section 5 and feeding and distribution cross-section 25 form openings 16 in the sealing devices 11, 12. Along the outer contour 18 of the plates 13, 14 and on the peripheral side around the intake port 5, as well as along the boundary edge of the feed 25 for the secondary gas, the sealing devices 11, 12 have a bulge-type enlargement 27 in order to provide a defined contact surface.

The suspension mount of the heating elements 6 within the intake port 5 is particularly rigid and favorable to the flow. In the region of the heating elements 6, the plates 13, 14 are provided with tabs 21 which are initially deformed by about 90° in the direction of the cylinder head 4 and/or in the direction of the induction pipe 3. Attachment of the heating elements 6 and electrical connection to the heating module 1 is achieved either by integral joining (e.g., welding or soldering) or by further shaping steps (e.g., crimping or bending) resulting in an enclosing of the suspension mount 21 on the heating element 6. In addition to the form-locking fixation achieved by the above attachment methods, the stability of the suspension mount 21 described can be increased by the use of adhesively acting media. To achieve a high vibrational rigidity of the joining, it is advisable to arrange the contact line between the flange-like part of the suspension mount 21 and the cooperating portion of the heating element 6 essentially parallel to the main excitation direction of the engine.

To electrically connect the heating module 1 to the power supply 8 and to regulating and diagnostic unit, the heating module 1 can be provided either with a plug or a push-on terminal strip. Alternatively, the electrical conductors of the flange can be connected to electrical cables which in turn are then connected to a plug.

Figure 3:
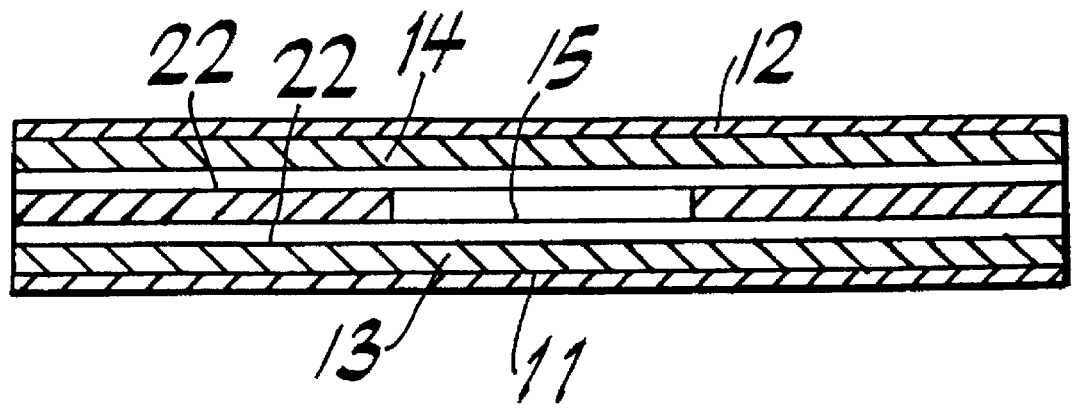
FIG. 3 shows the heating module of FIG. 2, cut along the line 3—3.
Figure 4:
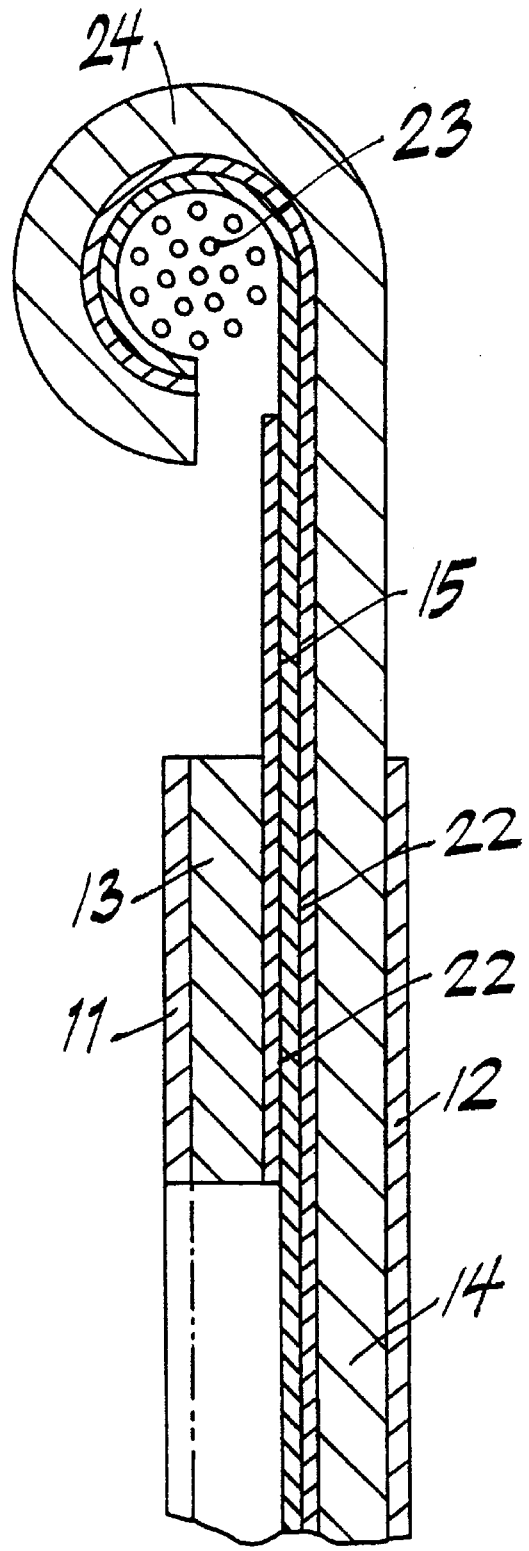
FIG. 4 shows the heating module of FIGS. 2 and 3, cut along the line 4—4.

In FIG. 3, section A—A, and in FIG. 4, section B—B through the heating module 1 in FIG. 2 is shown.

A conductor 15 is arranged between the plates 13, 14 which is joined to the plates 13, 14 by an adhesive agent 22. The heating module 1 is provided with connecting cables 23 which are retained in sheet metal enclosures 24 in the region of their points of contact.

Figure 5:
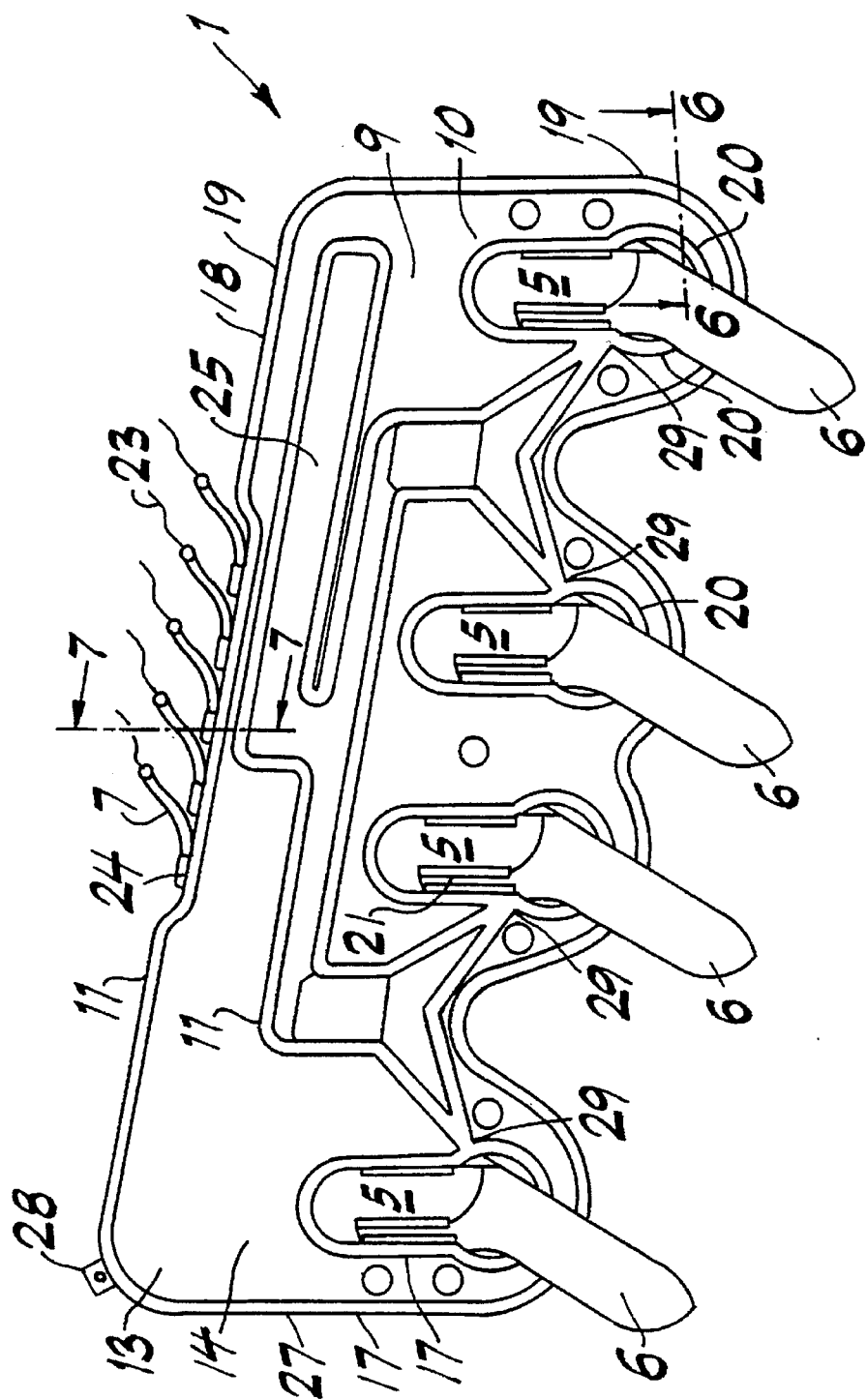
FIG. 5 shows a second exemplary embodiment of the heating module, in which the sealing of the flange surface deviates from the corresponding sealing of the heating module in FIGS. 2 through 4.
Figure 6:
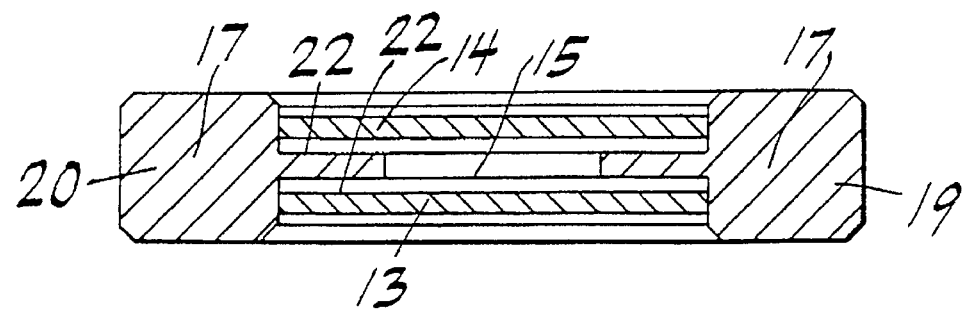
FIG. 6 shows the heating module of FIG. 5, cut along the line 6—6.
Figure 7:
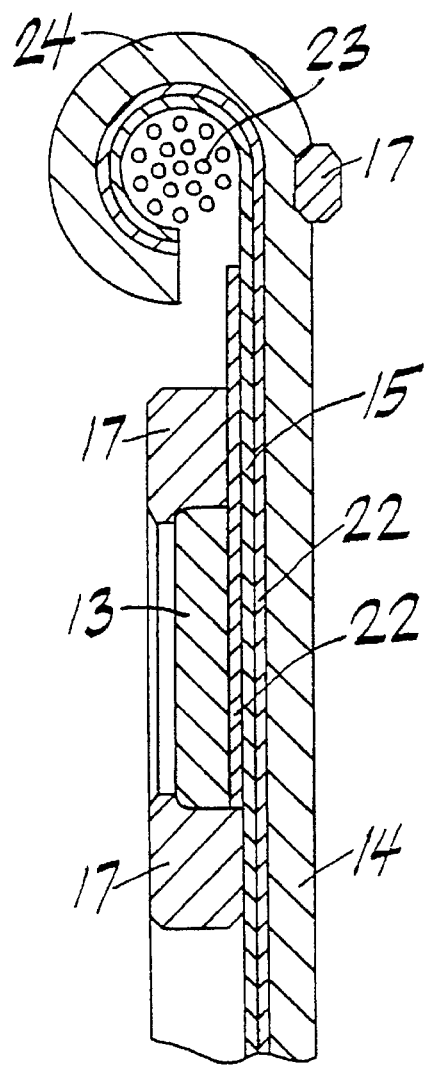
FIG. 7 shows the heating module of FIGS. 5 and 6, cut along the line 7—7.

In FIGS. 5 through 7 a heating module 1 is shown which corresponds essentially to the heating module 1 of FIGS. 2 through 4. In contrast to the sealing devices 11, 12 in FIGS. 2 through 4, the sealing devices 11, 12 in FIGS. 5 through 7 are designed as sealing projections and are provided with sealing surfaces 17. The sealing projection 17 extends along the outer contour 18 of the plates 13, 14 and surrounds each of the intake ports 5. The sealing projection 17 is constructed in two parts, the first part 19 extending along the outer contour 18 of the plates 13, 14 and the second part 20 surrounding the intake ports making a seal. Also in this exemplary embodiment, a feed 25 for secondary gas is provided within the heating module 1, the secondary gas being able to be supplied to the individual induction pipes 5, through openings 29, on paths of equal length.

Figure 9:
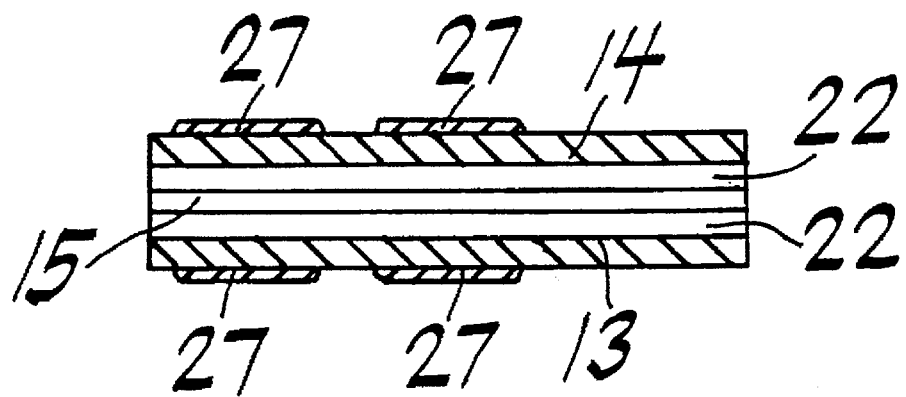
FIG. 9 shows the section 9—9 from FIG. 8.
Figure 8:
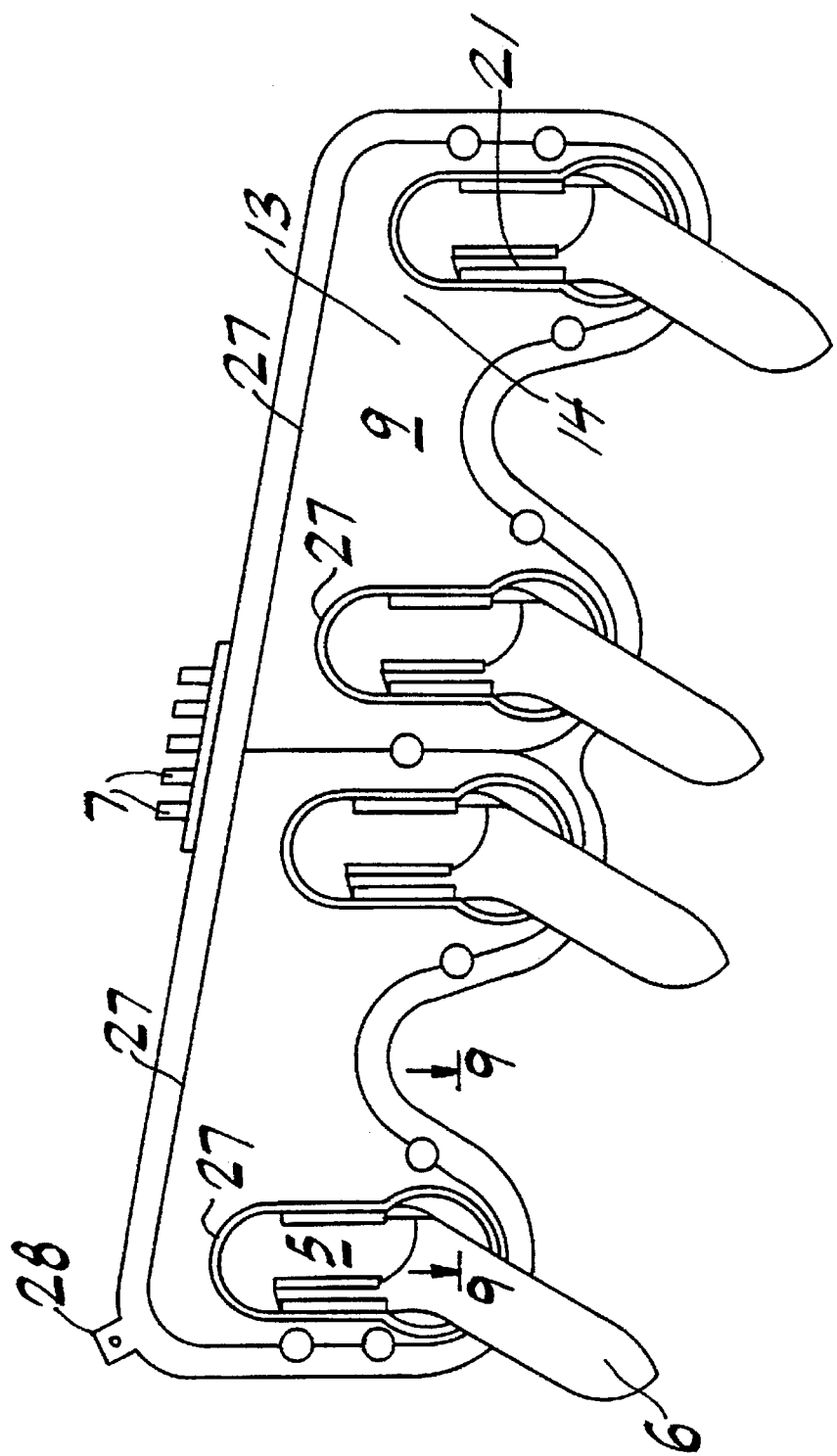
FIG. 8 shows a third exemplary embodiment of the heating module, which has sealing devices deviating from FIGS. 2 and 5.

In FIGS. 8 and 9 a third exemplary embodiment of a heating module 1 is shown, several connecting terminals 7 being provided for the connection of a regulating or diagnostic unit. The ground contact tab is provided with the reference number 28.

The sealing devices 11, 12 are adhesively pressed on the plates 13, 14.

We claim:

1. A heating module for a combustion engine, said heating module being arranged between an induction pipe and a cylinder head of said combustion engine, the heating module being connectable with connecting terminals to an electric current source, comprising:

at least one foil-like thin plate made of a metallic material;

a conductor made of electrically conductive material secured to said at least one plate;

sealing devices on a side of said heating module facing said induction pipe and a side of said heating module facing said cylinder head; and at least one electrically heatable heating element.

2. The heating module of claim 1, further comprising:

two said foil-like thin plates, said conductor being arranged between said two plates.

3. The heating module of claim 1, wherein:

said conductor is adhesively joined to said at least one plate.

4. The heating module of claim 1, wherein:

said at least one plate has a thickness of 0.2 to 1.5 mm and comprises an aluminum alloy.

5. The heating module of claim 1, wherein:

said at least one plate comprises joining surfaces, and wherein said sealing devices are integrally molded to said joining surfaces, and wherein said sealing devices are made of an elastomeric material.

6. The heating module of claim 5, wherein:

said sealing devices are foil-like thin and cover said joining surfaces, and wherein said the sealing device includes an opening corresponding to a cross-section of said intake port.

7. The heating module of claim 5, wherein:

said sealing device comprises an essentially bulge-type sealing projection which has a sealing surface on a side facing away from said joining surfaces, and wherein said sealing projection is arranged along an outer contour of said at least one plate and also surrounds said intake port.

8. The heating module of claim 7, wherein:

said sealing projection comprises two parts: a first part arranged along said outer contour of at least one plate, and a second part surrounding said intake port.

* * * * *